United States Patent [19]

Sexton

[11] Patent Number: 5,056,001

[45] Date of Patent: Oct. 8, 1991

[54] METHOD FOR CONFIGURING AN INPUT/OUTPUT MODULE COUPLED TO A PROGRAMMABLE LOGIC CONTROLLER

[75] Inventor: Daniel W. Sexton, Charlottesville, Va.

[73] Assignee: GE Fanuc Automation North America, Inc., Charlottesville, Va.

[21] Appl. No.: 453,655

[22] Filed: Dec. 20, 1989

[51] Int. Cl.$^5$ .................... G06F 13/10; G06F 3/147
[52] U.S. Cl. ............................ 364/200; 364/232.2; 364/286.2
[58] Field of Search ... 364/200 MS File, 900 MS File; 371/11.1

[56] References Cited

U.S. PATENT DOCUMENTS

| | | | |
|---|---|---|---|
| 4,075,693 | 2/1978 | Fox et al. | 364/200 |
| 4,245,308 | 1/1981 | Hirschman et al. | 364/200 |
| 4,266,271 | 5/1981 | Chamoff et al. | 364/200 |
| 4,326,263 | 4/1982 | Given et al. | 364/900 |
| 4,403,303 | 9/1983 | Howes et al. | 364/900 |
| 4,604,690 | 8/1986 | Crabtree et al. | 364/200 |
| 4,839,852 | 6/1989 | Knutsen . | |
| 4,974,151 | 11/1990 | Advani et al. | 364/200 |
| 4,979,107 | 12/1990 | Advani et al. | 364/200 |
| 5,014,193 | 5/1991 | Garner et al. | 364/200 |

Primary Examiner—Allen R. MacDonald
Assistant Examiner—Gopal C. Ray
Attorney, Agent, or Firm—James H. Beusse

[57] ABSTRACT

A method is provided for configuring a smart module which is coupled to a programmable logic controller. The controller includes an initial configuration file which specifies an initial configuration for the smart module. After power up and initialization of the controller, the initial configuration file is transmitted from the controller to the smart module. The initial configuration file is now designated a current configuration file and the smart module assumes the configuration specified by the current configuration file. In accordance with the method of the invention, module specific information which is stored in the module is then displayed to aid a user in configuring the module. The user can then modify the current configuration file in response to the module specific information which was displayed. This method significantly simplifies the process of configuring smart modules for the user.

2 Claims, 2 Drawing Sheets

METHOD FOR CONFIGURING AN INPUT/OUTPUT MODULE COUPLED TO A PROGRAMMABLE LOGIC CONTROLLER

BACKGROUND OF THE INVENTION

This invention relates in general to programmable logic controllers and, more particularly, to a method for configuring a smart module coupled to a programmable logic controller system.

Programmable logic controllers (PLC's) are a relatively recent development in process control technology. As a part of process control, a programmable logic controller is used to monitor input signals from a variety of input modules (input sensors) which report events and conditions occurring in a controlled process. For example, a PLC can monitor such input conditions as temperature, pressure, volumetric flow and the like. A control program is stored in a memory within the PLC to instruct the PLC what actions to take upon encountering particular input signals or conditions. In response to these input signals provided by input modules, the PLC derives and generates output signals which are transmitted to various output modules (output devices) to control the process. For example, the PLC issues output signals to open or close a relay, raise, or lower temperature, adjust pressure, or control the speed of a conveyer, as well as many other possible control functions.

Programmable logic controllers generally include a central processing unit which is coupled to a main bus into which a plurality of input modules and output modules are coupled. Input expansion boxes and output expansion boxes are usually connected to this main bus to facilitate the coupling of several input and output modules to the main bus of the controller.

Modern input and output modules are often rather complex in that they may contain a microprocessor and require substantial setup data from the user. A hand held programmer is generally used to configure such modules and to provide information about the modules to the programmable logic controller. This is a time consuming process in which the user is prompted with a series of questions by the hand held programmer and is required to provide answers which constitute configuration setup information. That is, the user interface which prompts the user with module setup questions is actually located in the hand held programmer software or the control program software for the PLC. Unfortunately, for this reason, in such PLC systems, the software which controls the PLC or the software which controls the hand held programmer must generally be rewritten to accommodate each new input module or output module which is developed.

SUMMARY OF THE INVENTION

One object of the present invention is to provide a method of configuring a smart module for a programmable logic controller by which the PLC software and hand held programmer software need not be rewritten for each new input module or output module.

Another object of the present invention is to provide a method for configuring a programmable logic controller which simplifies the setup of smart input and output modules for the PLC user.

In accordance with the present invention, a method is provided for configuring a module which is coupled to a programmable logic controller, the controller including a memory and being capable of executing a control program to control a process. The method includes the step of storing module specific information in the module. The method further includes the step of displaying the module specific information to aid a user in configuring the module.

In accordance with another embodiment of the method of the invention, a method is provided for configuring a module which is coupled to a programmable logic controller, the controller including a memory and being capable of executing a control program to control a process, the controller including an initial configuration file which specifies an initial configuration for the module. The method includes the step of transmitting the initial configuration file from the controller to the module at which the initial configuration file is designated a current configuration file. The method further includes the step of displaying module specific information stored in the module to aid a user in configuring the module. The method still further includes the step of modifying the current configuration file in response to the module specific information displayed in the displaying step.

BRIEF DESCRIPTION OF THE DRAWINGS

The features of the invention believed to be novel are specifically set forth in the appended claims. However, the method of operation of the present invention may best be understood by referring to the following description and accompanying drawings in which:

DETAILED DESCRIPTION OF THE INVENTION

Figure 1:
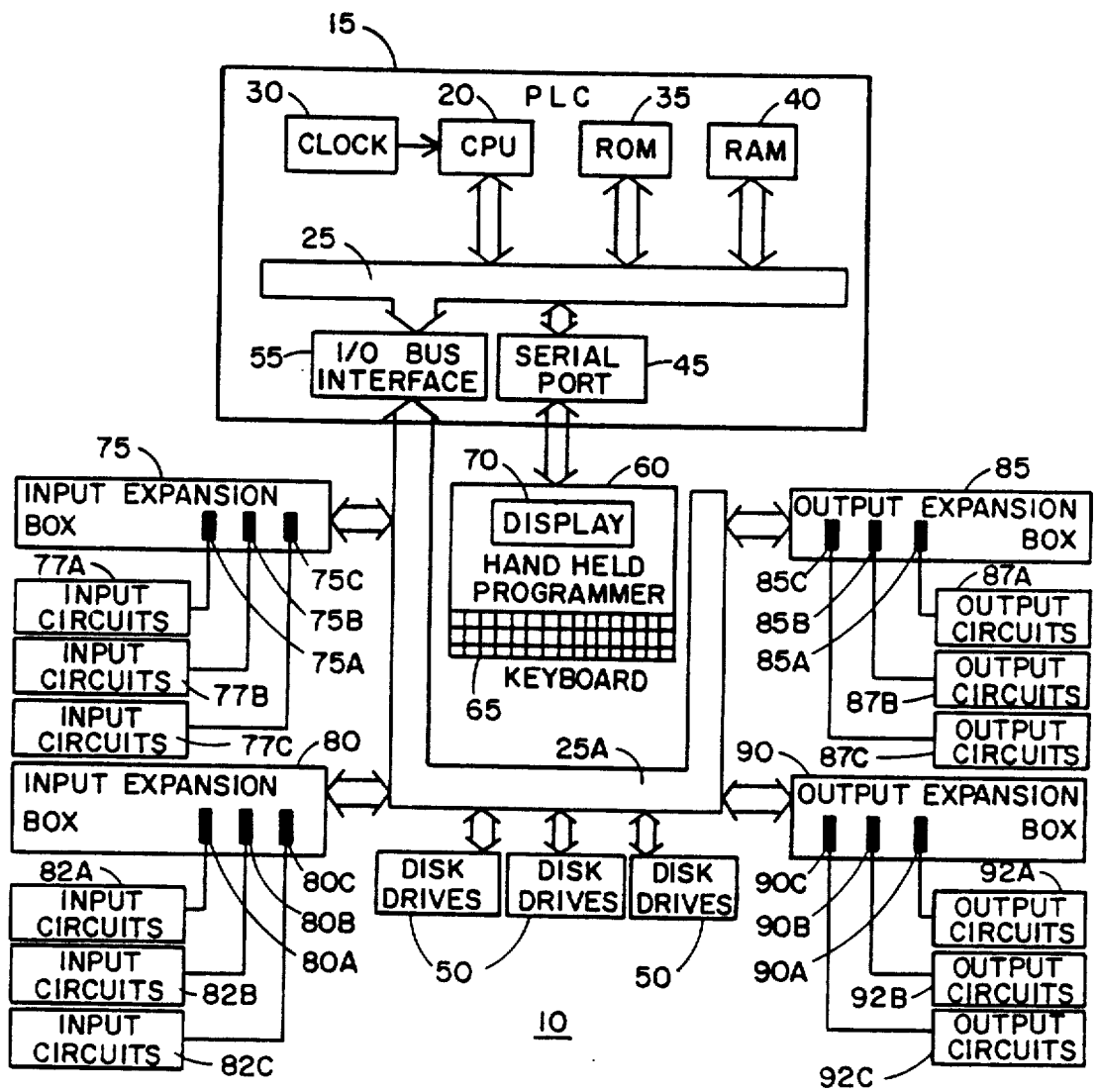
FIG. 1 is a block diagram of a programmable logic controller on which the method of the present invention may be practiced.

FIG. 1 shows a block diagram representation of a programmable logic controller system 10 on which the method of the invention may be practiced. System 10 includes a programmable logic controller (PLC) 15 including a central processing unit (CPU) 20 coupled to a main bus 25. A clock 30 is coupled to CPU 20 to provide a time base thereto. A read only memory (ROM) 35 is coupled to main bus 25 to provide CPU 20 with permanent storage in the conventional fashion. A random access memory (RAM) 40 is coupled to main bus 25 to provide memory space for CPU 20 to conduct PLC operations and store user programs.

One or more disk drive devices 50, such as hard or floppy disk drives for example, are coupled to main bus 25 via I/O bus interface 55 as shown in FIG. 1.

A hand held programmer (HHP) 60 is coupled to main bus 25 to enable the user to input information into PLC 15. Programmer 60 includes a keyboard 65 through a serial port 45 on which the user types input information and further includes a display 70 to permit the user to view the input information while the input information is being keyed into keyboard 65.

A plurality of input ports are coupled to main bus 25 of PLC 15 via one or more input expansion boxes such as input expansion boxes 75 and 80 which are coupled to main bus 25 as shown in FIG. 1. More specifically, expansion box 75 includes a plurality of input ports in the form of bus connector slots (not shown) for receiving respective input modules or cards 75A, 75B and 75C therein, each module having a port address associated therewith. Although for purposes of illustration, input expansion box 75 is shown as including three input modules 75A, 75B, and 75C, in actual practice box 75 could accommodate more input modules by employing expansion boxes with more slots (input ports) than shown. Each of input modules 75A, 75B, and 75C is coupled to a respective input circuit 77A, 77B, and 77C. Input circuits 77A, 77B, and 77C sense respective conditions and generate input signals which are reported to the input modules respectively coupled thereto. The actual input points monitored by a control program in PLC 15 are located at these input circuits 77A, 77B, and 77C, respectively or are coupled thereto.

In a fashion similar to expansion box 75, expansion box 80 includes a plurality of inputs or slots into which input modules cards 80A, 80B, and 80C are pluggable. A plurality of input circuits 82A, 82B, and 82C are coupled to input modules 80A, 80B, and 80C, respectively, such that information sensed at the respective input points associated with input circuits 82A, 82B, and 82C is provided to input modules 80A, 80B, and 80C for transmission to and processing by PLC 15. A plurality of output ports are coupled to main bus 25 of PLC 15 via one or more output expansion boxes such as output expansion boxes 85 and 90 which are coupled to main bus 25. That is, in a manner similar to that of input expansion box 75, output expansion box 85 includes a plurality of output ports in the form of bus connector slots (not shown) for receiving respective output modules 85A, 85B, and 85C therein, each output module having a respective port address associated therewith. Although for example purposes, output expansion box 85 is shown as including three output modules 85A, 85B, and 85C. In actual practice, output expansion box 85 may include a greater number of slots to accommodate a correspondingly greater number of output modules. Each of output modules 85A, 85B, and 85C produces a respective output control signal which is processed by an output circuit and then used to control or drive a particular device. More specifically, each of output modules 85A, 85B, and 85C is coupled to a respective output circuit 87A, 87B, and 87C. Output circuits 87A, 87B, and 87C may be alternatively referred to as amplifiers or device drivers which amplify the level of the output control signals which provide up to a level sufficient to drive the particular controlled device (not shown) coupled to the output circuit. The actual output points controlled by the control program in PLC 15 are located at these output circuits 87A, 87B, and 87C, respectively or are coupled thereto.

In a manner similar to output expansion box 85, output expansion box 90 includes a plurality of outputs or slots into which output cards 90A, 90B, and 90C are pluggable. A plurality of output circuits 92A, 92B, and 92C are coupled to output cards 90A, 90B, and 90C, respectively, such that the control signals associated with output circuits 90A, 90B, and 90C are provided to output cards 90A, 90B, and 90C to facilitate control of the devices coupled to the output points associated with such output circuits.

It will be recalled from the earlier discussion that a control program is provided to PLC 15 to control the operation of PLC with respect to a particular controlled process. PLC 15 is not limited to executing a particular control program. Rather, different control programs may be loaded at different times into PLC 15 to enable PLC 15 to monitor various input points and to issue output control signals to various output points to permit control of different controlled processes.

The present invention is concerned with the configuration of so called "smart I/O modules", namely those modules including a microprocessor requiring specific configuration and status monitoring by the user, and which only communicate on main I/O bus 25. Module 75A will be considered to be such a smart module. One example of such a smart module 75A is the high speed counter module described and claimed in the copending patent application entitled "Reconfigurable Counter Apparatus And Method Of Operation Thereof", Ser. No. 07/355,266, filed May 22,89, and assigned to the assignee of the present invention and incorporated herein by reference. Appropriate signals from a programmable logic controller can instruct this high speed counter to be configured as 1) 4 low complexity Type A counters, each of which may be configured as an up counter or a down counter; or 2) 2 medium complexity Type B counters; or 3) 1 high complexity Type C counter.

In conventional PLC systems, all communications with the hand held programmer are generally done through the PLC CPU. This places a very heavy burden on the hand held programmer software and control program software since the user interface, namely all programming, editing, data monitoring and configuration screens must be generated by such software. In other words, the user interface is largely provided by the hand held programmer software and the control program software so as to undesirably load down such software.

In accordance with the method of the present invention, most of this interface software required for configuration and status monitoring in the hand held programmer software or the control program software is advantageously eliminated by locating module specific information in a smart module such as module 75A. As will be seen subsequently, if a module is not present in a particular slot, provision is made for the user to manually construct a generic configuration file in PLC 15.

In one embodiment of the invention, the protocol established for communicating between PLC 15 and smart module 75A is selected such that messages sent by PLC 15 to smart module 75A are fixed in length so that module 75A knows ahead of time how many bytes are to be transferred to it in a particular message. However, messages sent from module 75A back to PLC 15 are variable in length in one embodiment of the invention.

It is noted that when PLC 15 is first powered on and initialized, a configuration file which is contained in PLC 15 is transmitted to smart module 75A to instruct module 75A what initial configuration to assume. This configuration file is stored in smart module 75A and smart module 75A assumes the configuration specified in this initial configuration file which was received from PLC 15. As will be discussed subsequently, the user can employ the method of the present invention to then modify this initial configuration by using hand held programmer 75A. The configuration which module 75A possesses at a particular point in time is later referred to as the "current configuration".

Figure 2:
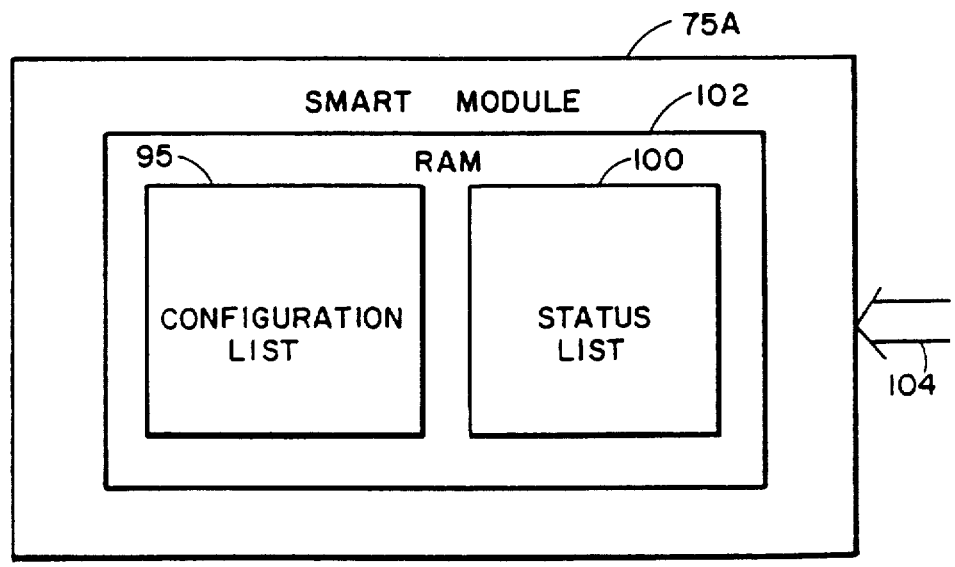
FIG. 2 is a block diagram of a smart module.

For purposes of configuring smart module 75A and for determining the status of smart module 75A, smart module data items are referenced by hand held programmer 65 as a list of parameters stored in module 75A. More specifically, as seen in the representation of smart module 75A in FIG. 2, smart module 75A includes two of such parameter lists, namely a module configuration information list 95 and a module status information list 100. Each of the parameters in configuration list 95 and status list 100 is assigned a unique number. Configuration list 95 and status list 100 are stored in a random access memory (RAM) 102 which is situated within smart module 75A. Module 75A includes an input/output port 104 for coupling module 75A to bus 25 via input expansion box 75.

In the method of the present invention, when hand held programmer 60 is used either to program a particular module 75A with configuration information or to monitor the status of such module, programmer 60 sends a data request to module 75A using such selected unique parameters numbers as desired. In response, module 75A returns the parameter data stored in module 75A corresponding to these particular parameter numbers. Additionally, in response, module 75A also sends hand held programmer 60 display information which describes how the returned parameter data should be displayed on the hand held programmer screens. Moreover, when appropriate in response to the above discussed data request, module 75A sends high and low limits on the data for a particular parameter and any ASCII descriptors required. Therefore, hand held programmer 60 need not be informed as to the specifics about the structure of module 75A or how module 75A is configured. Rather, smart module 75A sends this module specific configuration information to hand held programmer 60 to aid the user in setting the configuration of module 75A.

In the method of the present invention, PLC 15 is capable of sending the following commands to module 75A:
1) Request Configuration Data
2) Send Configuration File.
3) Request Configuration File
4) Request Status Data
5) Send Individual Configuration Parameter
6) Send Parameter Number More specifically, the following Table 1 lists these commands adjacent each command's associated hexadecimal code.

TABLE 1

| CODE | COMMAND |
| --- | --- |
| F0 | Send Parameter Number |
| F1 | Send 11 Byte Configuration File |
| F2 | Send 78 Byte Configuration File |
| F3 | Request Configuration Data |
| F4 | Request Status Data |
| F5 | Request 11 Byte Configuration File |
| F6 | Request 78 Byte Configuration File |
| FA | Send Single Configuration Parameter |

The above commands are now discussed.

The REQUEST CONFIGURATION DATA command is sent by PLC 15 to request the current configuration stored in smart module 75A. More specifically, the parameters which PLC 15 desires are requested from smart module 75A one data value at a time. The response from smart module contains the desired configuration data, an ASCII string to be displayed on hand held programmer 60, information with respect to the format in which the data is to be displayed, and the length of the data in bits. This screen information which is specific to module 75A is provided to hand held programmer 60 for display to the user as an aid to the user in configuring module 75A. Range of value information may also be sent from module 75A to programmer 60 for display to aid the user.

The REQUEST CONFIGURATION DATA command is used in conjunction with the SEND PARAMETER NUMBER command. That is, hand held programmer 60 first sends the desired parameter number to smart module 75A and then transmits a REQUEST CONFIGURATION FILE or REQUEST STATUS DATA command. Smart module 75A then uses the parameter number which it received from programmer 60 to determine the particular data item to be returned to programmer 60 in a response. In other words, smart module 75A sends a data item back to programmer 60 which corresponds to the parameter number which programmer 60 sent to module 75A in the REQUEST CONFIGURATION DATA command which was first sent.

The SEND CONFIGURATION FILE command is used by PLC 15 to send the configuration data to smart module 75A. This configuration file is sent to the smart module 75A by PLC 15 at the time PLC 15 is powered up and initialized. CPU 20 sends a module configuration file to smart module 75A only if module 75A contains valid data in its RAM 102. It is seen from Table 1 that two different byte length SEND CONFIGURATION FILE commands are provided for use according to the complexity of the configuration desired for smart module 75A.

The REQUEST CONFIGURATION FILE command is sent by PLC 15 to smart module 75A to request the configuration data from smart module 75A. When smart module 75A receives this command, module 75A sends PLC 15 the present configuration file contained therein. Again, it is seen from Table 1 that two different byte length REQUEST CONFIGURATION FILE commands are provided for use according to the complexity of the configuration desired for smart module 75A.

The REQUEST STATUS DATA command is sent by PLC 15 to smart module 75A to request status display data from module 75A. This REQUEST STATUS DATA command operates similarly to the configuration request/response sequence described above. However, when module 75A receives such a REQUEST STATUS DATA command, it may reference a different list of parameters, namely status parameters. In a manner similar to the configuration commands discussed earlier, the SEND PARAMETER NUMBER command must precede the REQUEST STATUS DATA command to inform module 75A exactly which status data to send PLC 15 from status list 102.

If, at initial power up, PLC 15 finds that no smart module is present in a particular slot in an expansion box, the present invention still provides the user with a way to create or edit a configuration file for that module which is not in place. When the user selects the module configuration mode and directs hand held programmer 60 to a particular unoccupied slot and no module is found to be present in that slot, then the creation of a generic smart module configuration file commences. In more detail, PLC 15 makes the determination of whether or not a smart module is present in a selected slot in the following manner. At initial power up of PLC 15, PLC 15 compares the module type in the initial configuration file in PLC 15 with the actual module type of the smart module selected for configuration. If a match does not occur between the module type in the initial configuration file in PLC 15 and the module type in the selected slot, then it is assumed that the slot is empty or that the wrong board is in such slot. This comparison occurs before the remainder of the configuration file is loaded from PLC 15 into smart module 75 at power up time.

If the above described mismatch is found, then the user is given an opportunity to manually, and without prompting by module specific information, enter the configuration of the module by specifying inputs % I and % AI, and output % Q and % AQ to create a generic configuration file. The first line in such generic configuration file is the board ID (identification number) followed by a module type ID (identification number). This module type ID identifies the type of smart module. The aforementioned manually provided (non-prompted) % I and % AI input information and % Q and % AQ output information follows the board ID and type ID in the generic configuration file. This generic configuration process is recommended primarily for the skilled module programmer because it is performed without the benefit of the aforementioned module specific information being displayed to aid module configuration by the user. That is, in this case, hand held programmer 60 will not be provided with the "help" module specific information contained in the smart module, since the module was found not to be present in the selected slot. Thus, the help text string for each parameter used as a prompt does not appear on the hand held programmer's display 65. Moreover, the help valid data range information does not appear on display 65.

However, if after power up, PLC 15 determines that the module type in the initial configuration file in PLC 15 matches the module type on the smart module in the selected slot, then it is determined that a smart module is present in the selected slot. In this case, the helpful module specific information contained in smart module 75A is then provided to hand held programmer 60 for display to aid the user in configuring smart module 75A as was described earlier.

Figure 3:
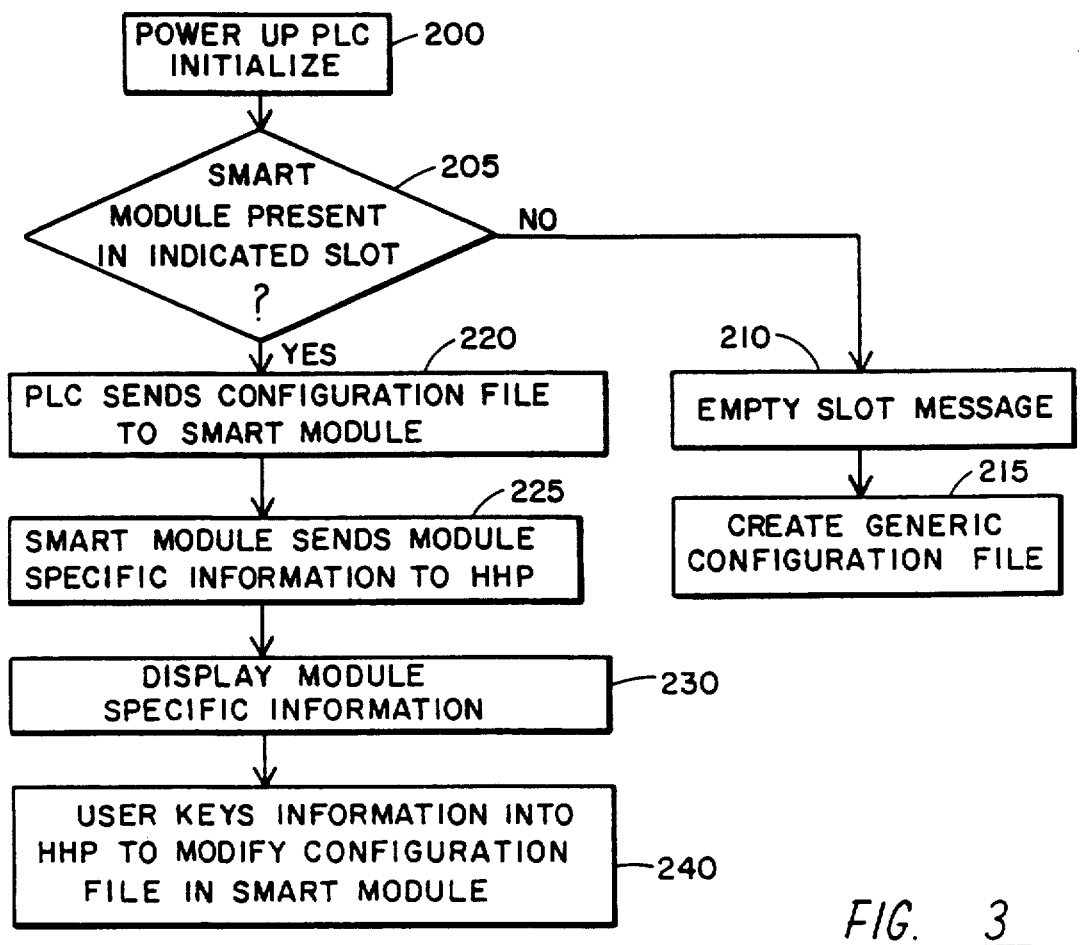
FIG. 3 is a flowchart detailing the steps employed in the method of the present invention.

FIG. 3 is a flow chart which summarizes the operation of the method of the present invention. PLC 15 is powered on and initialized at block 200. A determination is made at decision block 205 whether or not the presently indicated slot contains a smart module. To determine this information, the user instructs PLC 15 that it should read an indicated slot in which the smart module 75A is said to reside. If it is determined that a smart module 75A is not present in the indicated slot, then an "EMPTY" message is displayed at block 210 and the user is given the opportunity to create a generic configuration file as per block 215, as was described earlier. However, if it is determined that a smart module 75A is present in the indicated slot, then PLC 15 sends an initial configuration file to smart module 75A as per block 220, such configuration file now being designated the current configuration file. Then smart module 75A sends module specific information to hand held programmer 60 at block 225. At block 230, programmer 60 displays this module specific information to the user to aid the user in adjusting the configuration of smart module 75A. In response to the displayed module specific information, the user keys information into hand held programmer 60 to modify the current configuration file at block 240.

The foregoing has described a method for configuring a smart module which is coupled to a programmable logic controller. The disclosed method desirably simplifies the setup of input and output modules for the PLC user. Moreover, the method permits a smart module to be configured in such a manner that the PLC software and hand held programmer software need not be rewritten for each new input module or output module. While only certain preferred features of the invention have been shown by way of illustration, many modifications and changes will occur to those skilled in the art. It is, therefore, to be understood that the present claims are intended to cover all such modifications and changes which fall within the true spirit and scope of the invention.

What is claimed is:

1. A method for configuring a module adapted for connection to a programmable logic controller, the controller including a memory and being capable of executing a control program to control a process, the controller including an initial configuration file which specifies an initial configuration for the module, a programmable unit being connected to the controller and including a keyboard for inputting manual commands to the controller and a display for displaying configuration data, said method comprising the steps of:

determining, by the controller, if a particular module is coupled to the controller;

transmitting, by the controller, of an initial configuration file from the controller to the particular module, said initial configuration file being stored in the particular module and being designated as the current configuration file, said transmitting step being performed only if said determining step confirms that the particular module is coupled to the controller;

transmitting, by the particular module, of module specific information stored in memory in the particular module to said programming unit;

displaying, by the programming unit display, of the module specific information stored in memory in the particular module;

inputting commands from the programming unit keyboard for modifying the current configuration file in response to the module specific information displayed in said displaying step;

providing, by the particular module, of module specific control data to the controller for enabling control of the particular module by the controller; and if the step of determining confirms that a particular module is not coupled to the controller, establishing a configuration file in the controller for the missing particular module and allowing entery of data into the configuration file from the programming unit so that the controller can execute control programs for operation testing without the missing particular module.

2. A method for configuring a module which is coupled to a programmable logic controller, the controller including a memory and being capable of executing a control program to control a process, the controller having stored therein an initial configuration file which specifies an initial configuration for the module, a programming unit being connected to the controller and including a user input device for inputting manual commands to the controller and a display for displaying configuration data, said method comprising the steps of:

transmitting, by said controller, the initial configuration file from the controller to the module and designating the initial configuration file as a current configuration file;

transmitting, by the module, of module specific information stored in memory in the module to said programming unit;

displaying, by the programming unit display, the module specific information stored in memory in the module, the module specific information comprising data required for configuring the module; and modifying, by user input to the programming unit, the current configuration file in the module in response to the module specific information displayed in said displaying step.

* * * * *